Patented Nov. 13, 1928.

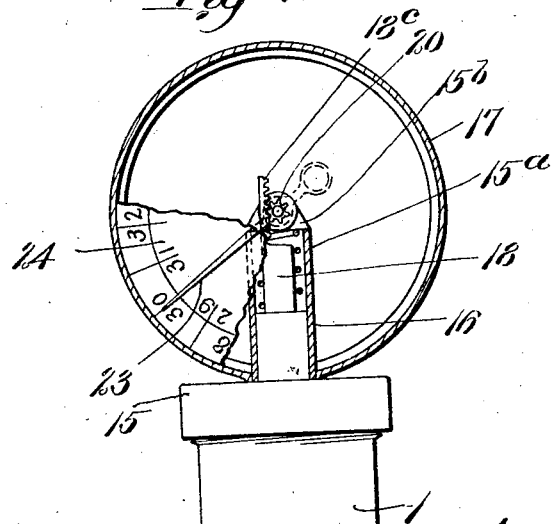
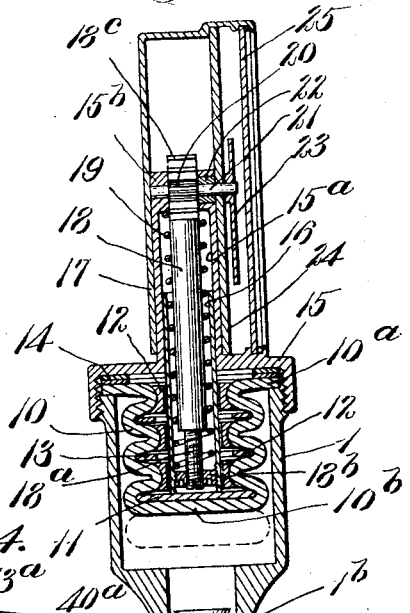
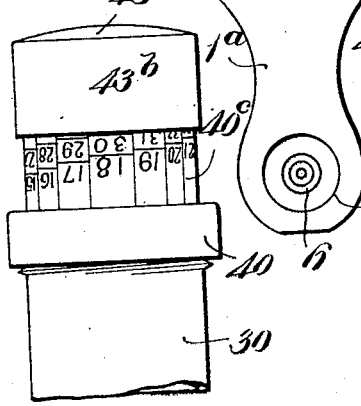
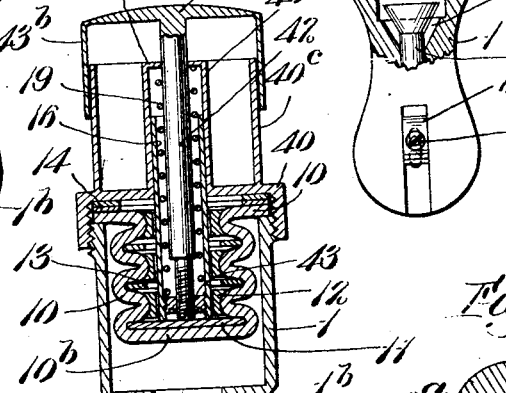
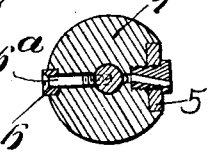
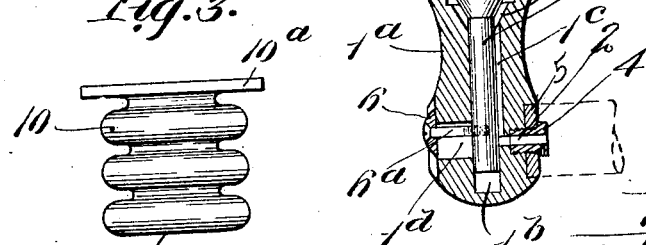

1,691,441

UNITED STATES PATENT OFFICE.

JOHN E. KENNEDY AND MICHAEL A. KENNEDY, OF LOS ANGELES, CALIFORNIA.

TIRE PRESSURE GAUGE.

Application filed August 8, 1925. Serial No. 48,977.

This invention relates to pressure gauges and particularly that type of pressure gauge that is adapted to temporary application to pneumatic tires to test the degree of air pressure present in any tire.

Heretofore commercial pressure gauges for this purpose have employed, as the air actuated element, either an elongated extensible rubber tube dependent on the elasticity or stretch of the rubber, or a Bourdon tube dependent on the spring or elasticity of a curved tube, but both these constructions are open to serious practical faults. As rubber when it remains stretched or distended rapidly deteriorates the coefficient of elasticity changes and the device, if approximately accurate when new, becomes increasingly inaccurate the longer it is used. The Bourdon tube devices, while more accurate at first than the extensible elastic tube, are very sensitive and quickly rendered useless by careless handling and tumbling about in a tool kit. Devices with a close fitting movable air tight piston are not commercially used because the friction necessary to make a leak-proof piston is so great as to prevent even approximate accuracy of pressure reading.

The object of the present invention is to overcome these difficulties by providing a pressure-testing gauge that when properly made, is and remains accurate for an indefinite period of time despite the ordinary rough usage to which such devices are commonly subjected, and a further object is to provide a device of this kind which will maintain its pressure reading after being applied to and removed from a tire so that it is unnecessary to closely inspect the same in the various positions it must assume when applied to tire stems in the different positions in which they stand when the car is at rest. These purposes are realized by the employment of movable air-sealing means that is completely responsive to variations in air pressure, thus affording accuracy, and that is not dependent on properties that are impaired by deterioration or careless handling, and is not required to overcome substantial frictional resistance in order to function.

With these and other objects in view the invention comprises, in combination with an air pressure chamber adapted to admit compressed air in the tire, of a tubular air-sealing diaphragm of flexible fabric secured to said chamber to be collapsible and extensible endwise independently of the stretch of material, and of a freely movable spring-pressed plunger arranged to oppose a counter-balancing thrust against the air-pressed end of said diaphragm and acting to move a pressure-indicating member over a pressure scale in accordance with variations in the air pressure of the tire. Another feature of the invention resides in the construction and arrangement by which a freely movable plunger is employed to maintain a pressure reading after the gauge has been removed from its application to the tire, the indicator member being connected with the plunger so as to be moved thereby in both directions. Another feature of the invention consists in a construction and arrangement whereby the compressed air admitted from the tire is retained in the device to preserve the pressure reading after the device has been removed from the tire, while permitting return of the pressure gauge to initial position at will.

These and other features of the invention will be described in the following specification and will be defined in the claims hereto annexed.

In the accompanying drawings we have illustrated specific embodiments of the principles of this invention, in which:

Figure 1 is a front elevation of the complete pressure gauge, a part of the face being broken away to show the interior plunger mechanism.

Figure 2 is a central vertical section through the device shown in Figure 1.

Figure 3 is a detail view showing, in elevation, the collapsible air-sealing diaphragm.

Figure 4 is a vertical central section showing a modified form of pressure indicator and of air-trapping and releasing device.

Figure 5 is a detail view showing, in elevation, the form of indicator shown in Figure 4.

Figure 6 is a transverse section through the inlet port and the valve shown in Fig. 4.

Figure 7 shows the supporting rings of the tubular diaphragm.

The forms of the invention illustrated in the drawings employ, for the admission of air to the interior of the pressure gauge, a seat adapted to form simply a pressure contact with the tire nipple without using a threaded coupling, but it will be understood that any form of air-tight connection between the device and the nipple of the tire stem may be employed.

As herein shown, the device comprises a hollow casing 1, forming an air pressure chamber with an inlet extension 1ª provided with a valve chamber or recess 1ᵇ normally closed by an inserted valve and having communication through the duct or passage 1ᶜ with the interior air chamber of the pressure gauge.

As it is more convenient, when testing a tire, to preserve the pressure gauge reading for easy inspection after the gauge has been removed from the tire, provision has been made, in this case, for trapping the compressed air admitted into the gauge from the tire so as to preserve the pressure reading, after which the confined air may be released to allow the gauge to return to initial position.

Accordingly, we have provided an inlet valve 3, constructed and arranged to permit manual control to open or close the valve at will and preferably acting to remain open or closed until shifted manually to the other position. As shown in Figures 4, 5 and 6, the valve 3 has an elongated cylindrical stem snugly fitted to slide in a longitudinal bore 1ᵇ, forming the valve chamber or recess, and has an enlarged tapered or conical flared end, preferably covered with rubber, and adapted to snugly contact with a similar conical valve seat surface forming the inner end of the valve chamber. At one side of the valve chamber 1ᵇ the cylindrical wall thereof is longitudinally grooved, as at 1ᶜ, to afford communication to a lateral inlet duct 2, formed in part by a headed nut 4, having threaded engagement with the part 1ª and bored to admit air into the lateral passage. This bored nut serves both to retain the seat washer 5, which is formed to be pressed against the end of the tire valve nipple, and the nut also provides a projection to engage and unseat the tire valve when the gauge is pressed firmly against the tire stem nipple with the rubber washer 5 in snug contact to admit air into the gauge, without external leakage.

The valve 3 may normally remain open to admit air, but after application of the gauge to the tire stem the valve is closed by a suitable finger-actuated button or shifting member comprising, in this case, a frictional slide 6 through which is passed a pin or screw 6ª, which projects inwardly through a narrow elongated slide 1ᵈ to engage or connect with the valve stem, such screw forming an actuating connection between the sliding button and the valve stem and also serving to retain the button in place.

When it is desired to take the pressure reading, the gauge, with the valve in open position, is pressed against the tire nipple with the yielding seat 2 pressed against the end of the tire stem nipple, thus unseating the tire valve and establishing communication between the interior of the tire and the air chamber inside the body or casing of the pressure gauge. Before the gauge is withdrawn from pressure contact with the tire nipple the valve 3 is closed tightly, thus trapping the compressed air inside the gauge without loss of pressure.

Inside the air chamber of the gauge is mounted a diaphragm of flexible material, impervious to air but not necessarily elastic or stretchable, comprising a tubular body 10 formed in annular folds alternately projecting inwardly and outwardly, and having an open end terminating in the form of a flange 10ª by which the device is fastened in place, the opposite end being closed by the end wall 10ᵇ. The flanged periphery is clamped against the upper end of the air chamber by any suitable means, as by a flanged internally threaded cap 15, an intermediate washer being interposed so that the rotative movement of the cap, when screwed in place, will not rub against the attaching or anchoring flange 10ª. Any number of annular convolutions or folds may be employed, according to the desired range of movement. In order that the movement of the diaphragm shall be limited to an endwise movement in order that the pressure of the air may be translated into an endwise movement of the diaphragm, the tubular portion thereof is supported against lateral thrust caused by the compressed air by means of a series of appropriately formed rings. In this case, as the air pressure is applied on the exterior of the tube, the tube-supporting members or rings are placed inside the ring and comprise exteriorly concaved rings 12, of relatively small diameter to support the interior or convex convolutions, and a series of thinner rings 13, of larger diameter that are inserted in the concavities formed by the folds. The bottom is prevented from buckling by means of a disk 11 of large enough diameter to support the lowermost fold. As these rings are separated from each other they are perfectly free to move endwise with the collapsing or extension movement of the tubular diaphragm without offering frictional resistance.

We prefer the arrangement by which the air pressure is applied to the exterior of the tubular diaphragm so as to have an endwise compressing movement thereon, although we do not confine ourselves to such application of the pressure.

The cap 15 is provided with a concentric tubular neck or extension 15ª partially closed at its upper end, as shown at 15ᵇ, to afford bearing support for a transverse rotative arbor 21 to which is secured a pinion 20 carrying an exterior pointer 23, moving around a dial plate 24 which is graduated and numbered to show the pressure measurement in pounds or other desired units of pressure.

Inside the tubular neck or extension 15ª is mounted a freely movable slidable sleeve 16 of tubular form whose lower end is threaded to receive a nut 18ᵇ which is adjustably screwed on the threaded extension 18ª of a reciprocatory plunger 18, whose upper end portion is cut away to form a series of rack teeth 18ᶜ intermeshing with the pinion 20. A helical compression spring 19, of predetermined resistance, is interposed between the plunger 18 and the sleeve 16, said spring thrusting at one end against the ledges formed at 15ᵇ by the partially closed end of the tubular extension 15ª, and thrusting at its other end against the adjustable tension nut 18ᵇ. The internal thread of the sleeve 16 and the thread on the reduced extension 18ª of the plunger are preferably made of the same pitch so that the nut, which is in the form of a spanner nut, may be adjusted to regulate the tension of the spring by compressing it to a greater or less degree, while at the same time preserving the same relative position between the plunger and its surrounding sleeve.

An annular casing 17, with one side perforated to receive the neck 15ª of the cap, is secured to the device and its front wall, forming the dial plate 24, is bored to allow the passage through it of the arbor 21. To allow the insertion of the arbor with the pinion 20 secured to it, a bushing 22 is provided in the bearing part 15ᵇ.

It will, therefore, be seen that upon pressing the nipple seat of the pressure gauge upon the nipple of the tire stem communication is instantly established between the interior of the tire and the casing enclosing the air sealing diaphragm so that the air pressure of the tire, in the form shown, collapses or shortens the tubular peripheral wall of the diaphragm so that the plunger is moved upward into its casing until a balance is established between the compression spring 19 and the air pressure exerted against the end wall of the diaphragm. This endwise movement of the plunger is translated into rotation of the pointer relative to the dial. When the tire gauge is to be removed from the tire stem, the air inlet valve is closed and traps the air so that none of the confined air escapes and the dial reading is maintained at the point established by the air pressure of the tire. To release the confined air the pressure of a finger against the slide button of the valve stem by the pin 6 affords a vent to allow the escape of air, so that the pointer returns to normal initial position.

It will be seen that the inlet valve is shifted to either closed or open position by the manually controlled member dispensing with any valve spring, and that the means for unseating the tire valve is substantial and reliable. When the inlet valve is closed the trapped air of itself tends to retain the valve in its closed position.

Figures 4 and 5 show a modified form of pressure indicator.

In this case a flanged threaded cap 40, having a concentric tubular extension 40ª, of smaller diameter is employed. The internal sleeve 16, the compression spring 19 and the adjusting nut 43, engaging the threaded extension of a plunger are the same as the construction previously described. The outer end of the tubular extension 40ª is closed by an end-wall 40ᵇ which is centrally bored to afford lateral bearing for a longitudinal plunger or spindle 42, whose lower end is reduced and screw threaded to have adjustable engagement with the nut 43 after the manner above described. The plunger or spindle has an enlarged head 43ª, provided with an annular flange 43ᵇ of sufficient depth and proper circumference to surround the exterior of a scale band 40ᶜ, carried by the cap 40. The scale marking is of a well known type in which a step series of short lines, circumferentially offset, indicate the various degrees of pressure with the appropriate numerals arranged to designate the lines, and the lower edge of the cap flange 43ᵇ will come to rest in alignment with one of these short scale lines, which indicates the number correctly indicative of the number of pounds pressure exerted upon the gauge.

To avoid frictional contact, which will be more or less subject to increase by the presence of dust, a slight clearance is provided between the annular indicator 43ᵇ and the scale-band or cylinder, contact being prevented by the fact that the plunger is supported against lateral play by the bearing 40ᵇ, and also by the bearing contact between the sleeve 16 and the exterior of the casing extension 40ª. Hence the device is perfectly responsive to slight changes in pressure and, like the other form described, is not subject to derangement or inaccuracy through changes in the co-efficient of elasticity in the diaphragm, nor is it subject to changes due to variations in frictional engagement because the indicator is supported and guided by interior bearings that are not exposed to an accumulation of dust.

In both cases the tire pressure reading is preserved for convenient inspection by trapping the air and not by the use of some frictionally retained member which is frictionally engaged and, therefore, prevents the sensitiveness of the pressure gauge.

If accurately constructed the device will be very sensitive to variations in pressure and will give accurate pressure indications indefinitely, and does not require careful and delicate handling to prevent derangement of the mechanism or shorten the duration of its effective service.

It will be perceived that as the air is trapped inside the air chamber by closing the valve manually before the pressure or other connection with the tire stem is broken there is no chance for air inside the gauge to escape while the connection of the tire is being broken, and therefore the pressure indication is preserved unimpaired for reading after removal from the tire. The confined air itself tends to keep the inlet valve securely seated after it has been moved to closed position. This is important since the body of air contained in the gauge is so small that even an instant's delay in closing the inlet valve when breaking the connection will vent the casing enough to materially diminish its pressure.

What we claim is:

1. A pneumatic-tire pressure gauge embracing in combination an air-confining chamber adapted for temporary application to a tire stem, a casing secured to the open end of said chamber, an air-confining diaphragm of pliable fabric interposed between the chamber and the casing, an extensible spring-pressed plunger mounted in the casing to oppose a yielding thrust against said diaphragm to counter-balance the air pressure, a spring-tensioning nut interconnecting the extensible members of the plunger to permit extension of the plunger without affecting the spring tension and to permit the tensioning of the spring without extending the plunger, and a pressure scale indicator controlled by the movement of the plunger.

2. In a pressure gauge, the combination with a compressed air chamber adapted for application to a tire stem, a plunger casing secured thereto, a pressure-responsive endwise collapsible diaphragm interposed to prevent the escape of air from the chamber to the casing, a spring-pressed plunger mounted in the casing to oppose yielding resistance to the air pressure thereon, said plunger having bearing engagement with an interior portion of the casing to maintain a straight line reciprocation, a hollow cap secured to the upper end of the plunger with its peripheral wall overlapping the outer wall of the casing, said outer wall being provided with a pressure-indicating scale serving, in conjunction with said cap, to measure the air pressure upon the diaphragm.

3. In a pressure indicating device, a pressure-actuated air seal for a compressed air chamber, embracing in its construction a tubular member of pliable fabric impervious to air having a closed end and having its circumferential wall formed with annular internal and external folds in alternation, and a series of spaced pressure-resisting members adapted to engage respectively convex and concave faces of successive folds to prevent lateral displacement thereof under pressure of the air, while allowing the closed end of the tubular member to move freely endwise to different positions in correspondence with the change in air pressure.

4. In a pressure indicating device, a pressure-actuated air seal diaphragm embracing in its construction a tubular member of pliable fabric impervious to air having a closed end and having its circumferential wall formed in alternating concave and convex folds, a series of separate supporting members disposed interiorly of said tubular members to engage and support the successive folds to prevent collapse of the circumferential wall while allowing the tube to collapse endwise under external air pressure.

5. In a tire pressure gauge, the combination with a compressed air chamber, of a tubular diaphragm of pliable air-proof fabric whose open end edge is secured to said chamber to confine air therein and whose closed free end forms a yielding seat for receiving the thrust of a movable spring-pressed plunger, the circumferential wall of said tubular diaphragm being formed in annular folds to render it extensible and contractible endwise without requiring stretch of the fabric, and means for preventing both the convex and the concave inner faces of said folds of the tubular wall from buckling under the external pressure of the compressed air without impairing freedom of contracting and expanding movements.

6. In a tire pressure gauge the combination with a compressed air chamber, of a tubular diaphragm of flexible impervious fabric secured peripherally at its open end to said air chamber, said tubular diaphragm having its free end closed to form a seat to yieldingly oppose the thrust of an interiorly disposed spring-pressed plunger and having its circumferential wall formed in annular folds to render it collapsible and extensible independently of any stretch of its fabric, and means arranged at intervals inside the folds of the tubular wall to reinforce both the inwardly and the outwardly turned folds against collapsing under pressure of the air, while leaving it free to expand and contract to establish a balance between the plunger and the air pressure.

7. In a tire pressure gauge, the combination with a compressed air casing adapted to be applied to a tire, to admit air from the tire into the casing, of a movable pressure indicator, a spring-pressed member arranged to yieldingly sustain and counterbalance the pressure of air admitted, and acting to move the pressure indicator to different pressure-indicating positions in conformity to the air pressure in the tire, and manually operated means for trapping the compressed air admitted from the tire into the casing to preserve the pressure reading after removal of the gauge from the tire.

8. In a tire pressure gauge, the combination with a casing forming a pressure tight chamber, and provided with a compressible seat adapted to form an airtight joint when pressed against the tire stem nipple to unseat the tire valve, an inlet valve arranged in said casing to normally admit air from the tire to the casing, an externally projecting manually operated valve-shifting device for closing and opening said valve at will, a movable pressure-responsive member and a pressure indicator whose position is determined by the position of the pressure responsive member.

9. In a tire pressure gauge, the combination of a hollow casing forming a compressed air chamber and longitudinally bored to form a valve chamber closed at one end, said valve chamber being provided with a lateral intake duct arranged to admit air from a pneumatic tire, and being provided with a longitudinal air passage affording communication between said lateral duct and the open end of said valve chamber, a valve slidably mounted in said valve chamber and having, at the inner end of its stem, an enlarged head formed to seat against the flared open end of said valve chamber to seal said longitudinal air passage, and a valve-shifting means arranged to be manually operated and having connection with the valve stem to open and close the valve at will, pressure-indicating means and means responsive to the pressure of the air confined in said casing by the closing of the valve, to maintain said indicating means at pressure-indicating position.

10. In a tire pressure gauge adapted to be applied to a pneumatic tire, the combination of a hollow casing having a longitudinal bore closed at its outer end to form a valve chamber, and provided with a lateral inlet duct in communication with a longitudinal air passage on one side of said valve chamber to admit air to the interior chamber of the casing and on its opposite side having a lateral slot, an intake valve having an enlarged head at its inner end to close said air passage when moved against its seat, and means extending through said slot to manually shift the valve from open to closed position.

11. In a pressure gauge for pneumatic tires, the combination with a hollow casing adapted to be applied to a tire stem to unseat the tire valve and admit air into the casing, pressure-responsive means, pressure indicating means actuated by said pressure-responsive means for indicating the pressure of the air admitted from the casing, and means for entrapping the air in said casing operable in advance of the interruption of the connection between the gauge and the tire whereby the admitted air is confined in the casing without loss in order to preserve unimpaired pressure indication after the gauge is removed.

In witness whereof, we have subscribed the above specification.

JOHN E. KENNEDY.
M. A. KENNEDY.